UNITED STATES PATENT OFFICE.

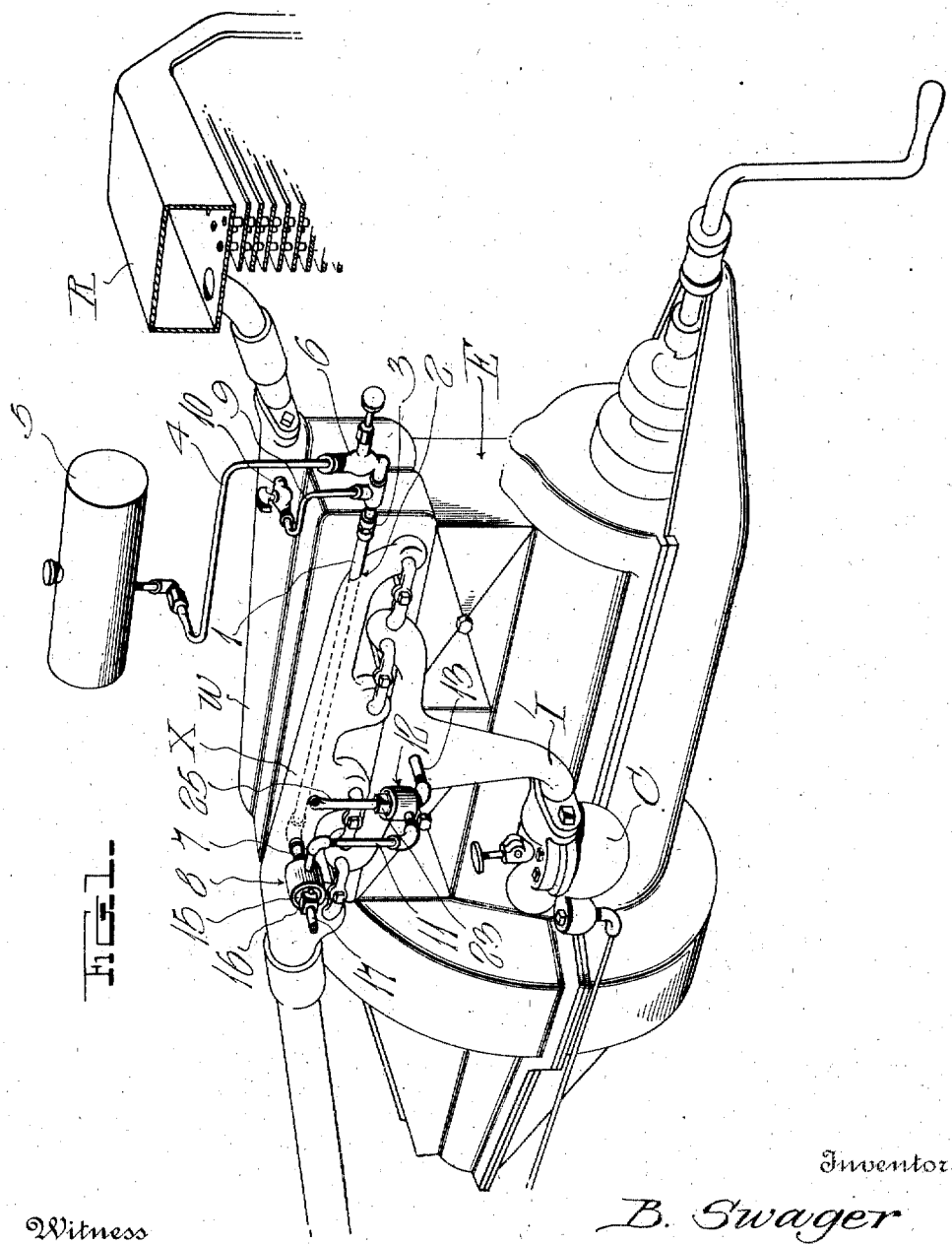

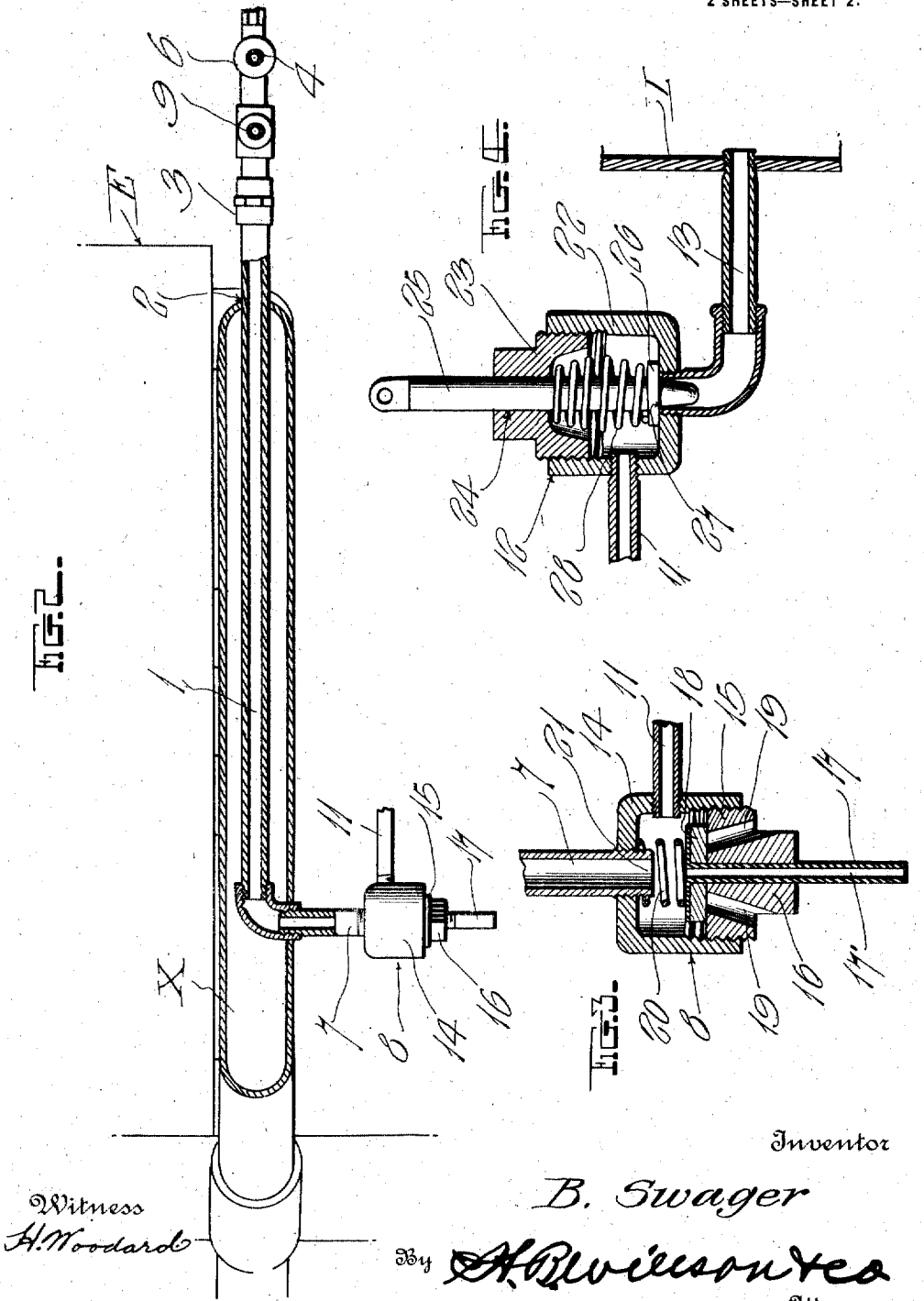

BENJAMIN SWAGER, OF SAUNEMIN, ILLINOIS.

VAPORIZING APPARATUS FOR INTERNAL-COMBUSTION ENGINES.

1,250,382. Specification of Letters Patent. Patented Dec. 18, 1917.

Application filed February 1, 1917. Serial No. 145,988.

*To all whom it may concern:*

Be it known that I, BENJAMIN SWAGER, a citizen of the United States, residing at Saunemin, in the county of Livingston and State of Illinois, have invented certain new and useful Improvements in Vaporizing Apparatus for Internal-Combustion Engines; and I do declare the following to be a full, clear, and exact description of the invention, such as will enable others skilled in the art to which it appertains to make and use the same.

This invention relates to means for improving the operation of internal combustion engines.

The principal object of the invention is to provide means whereby kerosene or similar oil in combination with water may be fed to the cylinders of an internal combustion engine in vaporized form, the heat necessary for causing this vaporization being supplied by the exhaust gases of the engine.

A secondary object is to provide an improved air control valve for supplying various quantities of air to the vaporized kerosene and water.

With these and other objects in view the invention resides in the novel features of construction, combination and arrangement of parts which will be hereinafter more particularly described and shown in the accompanying drawings wherein:—

Figure 1 is a perspective view of an automobile engine having my improved apparatus applied thereto;

Fig. 2 is a horizontal section through the exhaust manifold of the engine shown in Fig. 1, illustrating more particularly the application of certain parts of my invention;

Fig. 3 is a longitudinal sectional view of the improved automatic air valve used in connection with the other parts of the apparatus; and Fig. 4 is a similar view of the control valve.

The invention may be applied to practically any type of internal combustion engine, but preferably one having its intake and exhaust manifolds on the same side as shown in the accompanying drawings. In these drawings a conventional form of hydro-carbon or internal combustion engine E is illustrated, the same having an intake manifold I, an exhaust manifold X and a water manifold W, the latter being connected to the usual radiator R. A carbureter C supplies fuel in vaporized form to the intake manifold, the liquid from which this gas is formed preferably being gasolene.

It is well known that by supplying steam or vaporized kerosene to the cylinders of the engine along with the combustible mixture that the formation of carbon on the cylinder walls or piston heads may be prevented. In case carbon has already formed within the engine the addition of either one of these elements to the combustible mixture will tend to loosen the same so that it may be blown out through the exhaust. Thus the engine will be rendered much more efficient. Ordinarily only one of these liquids is used at one time, but by the structure which is shown in the accompanying drawings both may be simultaneously supplied in the form of vapor.

In carrying out my invention a rather long vaporizing pipe 1 is disposed within the exhaust manifold X longitudinally thereof, said pipe entering at one end through an opening 2 and extending nearly to the opposite end. The end of the pipe 1 which projects through this opening 2 is the inlet end and is connected by a suitable connection such as the union 3 to a supply pipe 4, the latter being extended upwardly and connected to a tank 5 of any preferred size. This tank is mounted above the engine by any desired means so that the kerosene or other similar oil which it contains may be fed to the vaporizing pipe by means of gravity. A valve 6 is positioned in the pipe 4 adjacent its connection with the union 3, this valve being designed to control the flow of liquid from the tank. The other end of the vaporizing pipe which terminates within the exhaust manifold has a right angular outwardly extending portion 7 connected thereto, such extension projecting through an opening in the wall of the manifold X. The novel form of automatic air control valve 8 is connected to this extension 7, its specific formation and operation will be hereinafter more particularly described.

In addition to kerosene, water is also fed to the vaporizing pipe 1, this water being supplied by the cooling system of the engine. A pipe 9 has one end connected to a valve 10 which is tapped into the water manifold W adjacent its connection with the radiator R. The opposite end of this pipe 9 is extended downwardly and joins the supply pipe 4 between the valve 6 and the union 3. Thus by regulating the valves 6 and 10 any desired quantity of kerosene and water may be allowed to run into the inlet end of the vaporizing pipe, where the head generated by the explosions within the cylinders of the engine will cause this mixture to become vaporized and thoroughly mixed, the water being turned into steam and superheated before it reaches the end of the vaporizing pipe, and the kerosene turned into a gas.

This mixture and the liquids from which it is formed are drawn into and through the vaporizing pipe 1 by the suction in the cylinders of the engine in the same manner as the charges of explosive mixture are drawn from the carbureter C. After entering the air control valve 8 which is at the outlet end of the vaporizing pipe, the mixture of steam and gas is carried through a connecting pipe 11 which joins the last mentioned valve with the control valve 12, the operation of which is regulated by the operator of the vehicle from any suitable point within the body of the machine. By adjusting this last mentioned valve the supply of steam and gas into the intake manifold I is limited. A short pipe 13 connects the valve 12 with the intake manifold above the carbureter C.

The automatic air control valve 8 consists of a cylindrical casing 14 which is open at one end and internally screw threaded, the closed end being centrally apertured to receive the apertured end of the extension 7. The side wall of the casing 14 is also apertured for the reception of the end of the connecting pipe 11. A plug 15 is secured into the threaded end of the casing 14 said plug having a boss 16 whereby the same may be easily rotated. This plug and the boss formed integrally therewith is centrally apertured to receive a tubular valve stem 17 which is slidably disposed therein, said stem having a head 18 positioned within the casing 14 and adapted to bear against the inner face of the plug to normally close a pair of inlet openings 19 formed therethrough, one on each side of the central opening. An expansion coiled spring 20 engages the valve head and the closed end of the casing to normally keep said valve in operative position, said spring being maintained centrally within the casing by the inwardly extending end 21 of the expansion pipe 7. The passageway 17' within the valve stem 17 is of relatively small diameter so that very little air may enter the valve casing except through the passage-ways 19, the latter being closed except when there is excessive suction within the engine cylinders.

From this description taken in connection with Fig. 3 it will be seen that a small quantity of air is being continuously drawn into the stem and mixed with the gas formed from the kerosene and the steam when the latter passes through the valve casing 14 from the extension pipe 7 to the connecting pipe 11, the diameter of the latter being relatively large compared with the size of the inlet passage 17'. In case there is excessive pressure within the vaporizing pipe due to the fact that too much kerosene and water are being vaporized, or when the engine "backfires," the smaller passageway 17' through the valve stem 17 will act as a vent to permit the excess gases to escape without damaging any of the parts of the apparatus. Under ordinary operation of the invention this passageway will operate only as an air inlet and not as a vent.

As above mentioned, the supply of vapor from the vaporizing pipe to the intake manifold is regulated by the valve 12, the same being formed of a tubular casing 22 and having one open end internally threaded to receive the externally threaded plug 23. The said plug has a central opening 24 through which extends a valve stem 25, the outer end being connected by suitable control levers (not shown) to a foot operated device within the body of the vehicle; the other end of the valve stem has a head 26 which coöperates with a seat 27 formed in the end of the connecting pipe 11 which extends through an opening in the closed end of said casing. A coiled spring 28 surrounding the valve stem 25 between the head 26 thereof and the plug 23 normally retains the valve closed. In both of the valves 8 and 12, it will be obvious that by adjusting their respective plugs inwardly, the tension of the springs therein will be varied so that the operation will be more or less difficult.

Various changes may be made in the form and proportion of this improved vaporizing apparatus to accommodate the same to use on various forms and types of internal combustion engines including both those used on automobiles and other vehicles and those ordinarily known as stationary engines.

I claim as my invention:

1. A device of the class described comprising in combination, an internal combustion engine, a vaporizing pipe disposed in the exhaust manifold of said engine and extending through a portion of the length thereof, a kerosene inlet pipe connected to the inlet end of said vaporizing pipe, a water inlet pipe also connected with the inlet end of said vaporizing pipe, means for controlling the flow of liquids from said inlet pipes, an air valve disposed on the end of said vaporizing pipe, and a connection between said valve and the intake manifold of said engine.

2. A device of the class described contaprising in combination, an internal combustion engine, a vaporizing pipe disposed in the exhaust manifold of said engine and extending through a portion of the length thereof, a kerosene inlet pipe connected to the inlet end of said vaporizing pipe, a water inlet pipe also connected with the inlet end of said vaporizing pipe, means for controlling the flow of liquids from said inlet pipes, an automatic normally closed air control valve on the end of the vaporizing pipe, said valve having a relatively small, continuously open, supplemental inlet and vent, and a relatively large outlet pipe connecting the valve with the intake manifold of said engine.

3. A device of the class described comprising in combination, an internal combustion engine, a heating pipe adjacent the exhaust manifold of said engine, means for supplying a liquid to one end of said heating pipe, an automatic normally closed air control valve opening into said pipe at its other end, a relatively small, continuously open, inlet and vent in said valve and a connection between the valve and the intake manifold of the engine.

4. A device of the class described comprising in combination, an internal combustion engine, a heating pipe adjacent the exhaust manifold of said engine, means for supplying a liquid to one end of said pipe, an automatically operated air control valve opening into said pipe at the opposite end, said valve having a casing provided with an air inlet, a valve head for closing said inlet, a stem for said valve slidable through the wall of the casing, said stem having a relatively small opening extending throughout its length to provide a supplemental air inlet and vent, and a relatively large pipe connecting the casing in said valve with the intake manifold of said engine.

In testimony whereof I have hereunto set my hand in the presence of two subscribing witnesses.

BENJAMIN SWAGER.

Witnesses:
P. H. LANNON,
JAMES M. PADDOCK.